US008227684B2

(12) United States Patent
Truman et al.

(10) Patent No.: US 8,227,684 B2
(45) Date of Patent: Jul. 24, 2012

(54) SOLAR PANEL FRAME (75) Inventors: James K. Truman, San Jose, CA (US); Benyamin Buller, Cupertino, CA (US)

(73) Assignee: Solyndra LLC, Fremont, CA (US)

( * ) Notice: Subject to any disclaimer, the term of this patent is extended or adjusted under 35 U.S.C. 154(b) by 805 days.

(21) Appl. No.: 11/934,295

(22) Filed: Nov. 2, 2007

(65) Prior Publication Data
US 2008/0110487 A1   May 15, 2008

Related U.S. Application Data (60) Provisional application No. 60/859,033, filed on Nov. 15, 2006, provisional application No. 60/859,188, filed on Nov. 15, 2006, provisional application No. 60/859,212, filed on Nov. 15, 2006, provisional application No. 60/859,213, filed on Nov. 15, 2006, provisional application No. 60/859,215, filed on Nov. 15, 2006, provisional application No. 60/859,162, filed on Nov. 27, 2006, provisional application No. 60/901,517, filed on Feb. 14, 2007.

(51) Int. Cl.
*H01L 31/042* (2006.01)
*H01L 31/00* (2006.01)

(52) U.S. Cl. ......... 136/251; 136/244; 136/252; 136/259

(58) Field of Classification Search ............. 136/246, 136/251, 255, 256, 259, 244, 252
See application file for complete search history.

(56) References Cited

U.S. PATENT DOCUMENTS

| | | | |
|---|---|---|---|
| 2,396,725 A * | 3/1946 | Thomas, Jr. ............ | 439/590 |
| 4,043,315 A | 8/1977 | Cooper | |
| 4,101,101 A | 7/1978 | Barkats et al. | |
| 4,132,570 A | 1/1979 | Caruso et al. | |
| 4,283,106 A * | 8/1981 | Bunnell ................. | 439/571 |
| 4,537,838 A | 8/1985 | Jetter et al. | |
| 4,540,843 A | 9/1985 | Gochermann et al. | |
| 4,571,446 A | 2/1986 | Yamazaki | |
| 4,663,495 A | 5/1987 | Berman et al. | |
| 4,832,001 A | 5/1989 | Baer | |
| 4,913,744 A | 4/1990 | Hoegl et al. | |
| 5,538,563 A | 7/1996 | Finkl | |
| 5,590,495 A | 1/1997 | Bressler et al. | |
| 5,597,631 A | 1/1997 | Furumoto et al. | |
| 5,603,627 A | 2/1997 | Evanisko | |
| 5,646,397 A | 7/1997 | Wenham et al. | |

(Continued)

FOREIGN PATENT DOCUMENTS

JP    59125670    7/1984
(Continued)

OTHER PUBLICATIONS

English machine translation of WO2005/078806.*

(Continued)

*Primary Examiner* — Basia Ridley
*Assistant Examiner* — Lindsey Bernier
(74) *Attorney, Agent, or Firm* — Morgan, Lewis & Bockius, LLP; Brett Lovejoy (57) ABSTRACT A solar panel apparatus includes a set of electrically-interconnected photovoltaic modules. Each module is elongated along an axis and has first and second axially opposite ends. Each module further has photovoltaic surface portions facing away from the axis in different directions to receive light to generate electricity. The first ends of the modules are fixed to a first end rail.

22 Claims, 8 Drawing Sheets

U.S. PATENT DOCUMENTS

| | | | |
|---|---|---|---|
| 5,990,413 | A | 11/1999 | Ortabasi |
| 6,150,602 | A | 11/2000 | Campbell |
| 6,201,180 | B1 | 3/2001 | Meyer et al. |
| 6,235,984 | B1 | 5/2001 | Wambach et al. |
| 6,465,724 | B1 | 10/2002 | Garvison et al. |
| 6,515,217 | B1 * | 2/2003 | Aylaian .................. 136/246 |
| 7,121,884 | B2 | 10/2006 | Osada |
| 2005/0098202 | A1 | 5/2005 | Maltby |
| 2005/0199278 | A1 | 9/2005 | Aschenbrenner |
| 2005/0217664 | A1 | 10/2005 | Patterson |
| 2006/0118163 | A1 | 6/2006 | Plaisted et al. |
| 2006/0243318 | A1 | 11/2006 | Feldmeier et al. |
| 2006/0288852 | A1 | 12/2006 | Zinell et al. |
| 2007/0102038 | A1 | 5/2007 | Kirschning |
| 2007/0227579 | A1 | 10/2007 | Buller et al. |
| 2008/0110492 | A1 | 5/2008 | Buller et al. |
| 2008/0113567 | A1 | 5/2008 | Buller et al. |
| 2009/0120486 | A1 | 5/2009 | Buller |

FOREIGN PATENT DOCUMENTS

| | | |
|---|---|---|
| JP | 60187066 | 9/1985 |
| JP | 07312441 | 11/1995 |
| JP | 09135039 | 5/1997 |
| JP | 11330523 | 11/1999 |
| JP | 2000 294821 | 10/2000 |
| JP | 2007 250857 | 9/2007 |
| WO | WO 2005/029657 | 3/2005 |
| WO | WO 2005/078806 | 8/2005 |
| WO | WO 2007/002110 | 1/2007 |

OTHER PUBLICATIONS

English translation of Japanese Patent Application Publication JP 2000-294821.
English translation of Japanese patent Application Publication JP 59-125670.
English translation of Japanese patent Application Publication JP 60-187066.
U.S. Appl. No. 11/934,247, filed Nov. 2, 2007.
Office Action issued by USPTO on Jul. 20, 2010 for U.S. Appl. No. 11/934,247.
English translation of WO 2005/029657.
Office Action issued by USPTO on Nov. 10, 2010 for U.S. Appl. No. 11/934,247.
Office Action, issued Nov. 24, 2010 by USPTO, for U.S. Appl. No. 11/934,327.
Manual translation, commissioned by Applicants, of Description section of WO 2005/078806.

* cited by examiner

SOLAR PANEL FRAME

CROSS-REFERENCE TO RELATED APPLICATION

This claims the benefit of U.S. Provisional Application Nos. 60/859,033, 60/859,188, 60/859,212, 60/859,213, 60/859,215, all filed Nov. 15, 2006, 60/861,162, filed Nov. 27, 2006, and U.S. Provisional Application No. 60/901,517, filed Feb. 14, 2007, all seven applications hereby incorporated by reference.

TECHNICAL FIELD

This application relates to solar panels.

BACKGROUND

A solar panel includes an array of photovoltaic modules that are electrically connected to output terminals. The modules output electricity through the terminals when exposed to sunlight.

DESCRIPTION

First Embodiment

Figure 1:
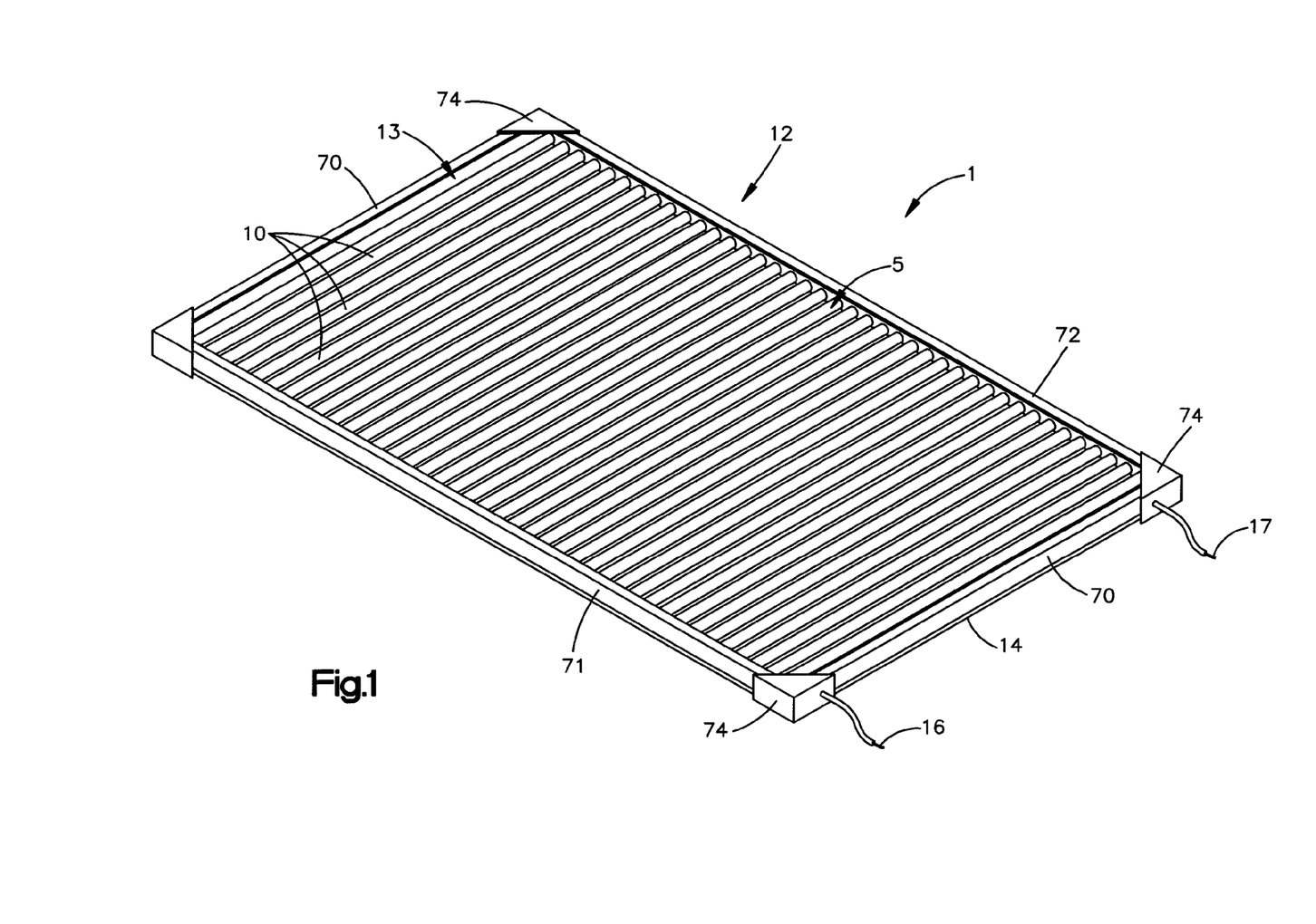
FIG. 1 is a perspective view of a solar panel, including a one-dimensional array of photovoltaic elongated photovoltaic modules mounted in a frame.
Figure 2:
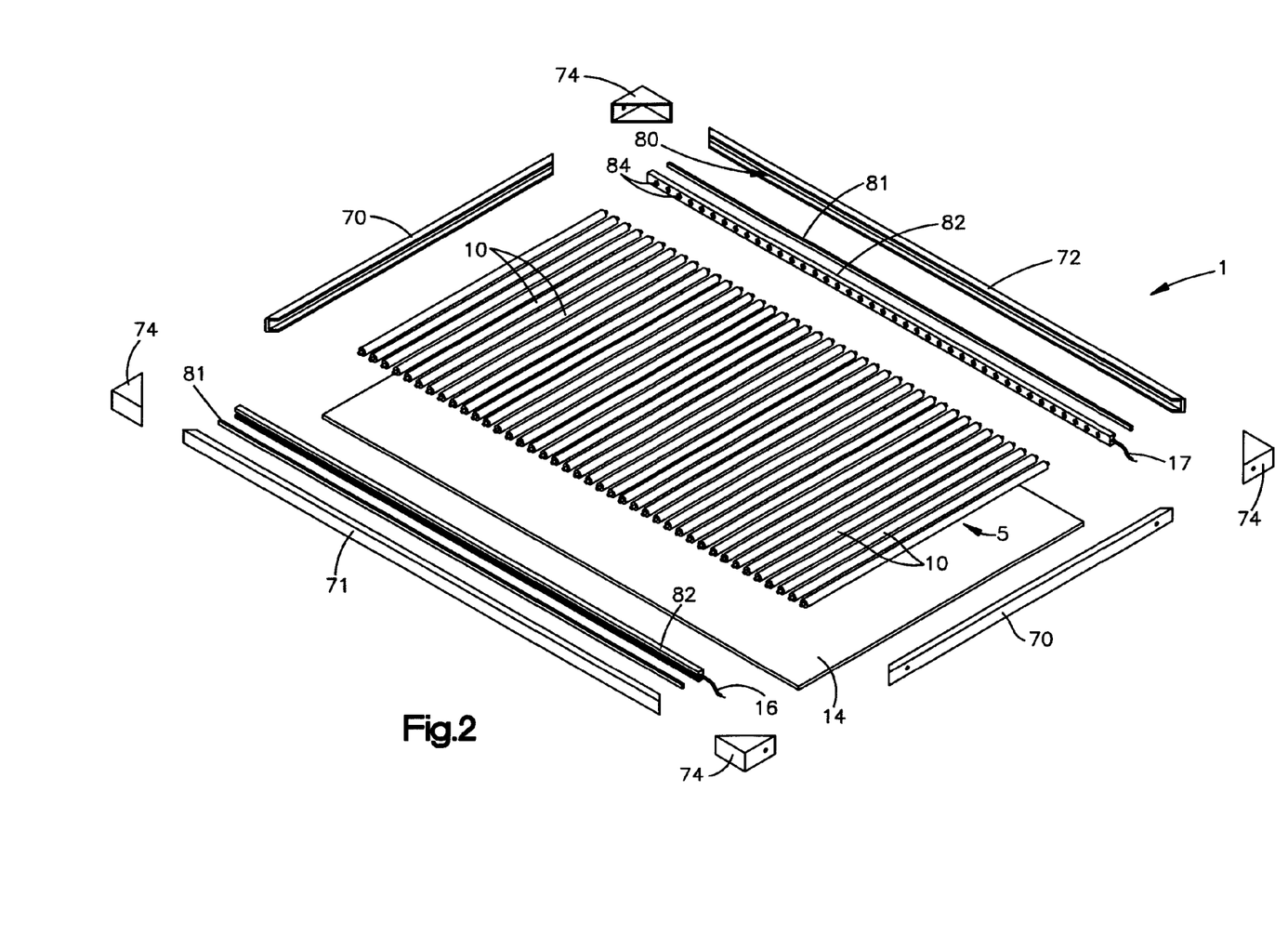
FIG. 2 is an exploded view of the panel.

The apparatus shown in FIGS. 1-2 has parts that are examples of the elements recited in the claims. These examples enable a person of ordinary skill in the art to make and use the invention and include best mode without imposing limitations not recited in the claims. Features from different embodiments described below can be combined together into one embodiment in practicing the invention without departing from the scope of the claims.

The apparatus is a solar panel 1. It includes a one-dimensional array 5 of parallel elongated photovoltaic modules 10 secured in a frame 12. The frame 12 has a front opening 13 configured to receive sunlight. The frame 12 can be mounted in front of a backplate 14 with a reflective surface such as a mirror surface or white coating. The reflective surface is preferably parallel with the module axes A. The photovoltaic modules 10 output electricity through two outlet terminals 16 and 17 when exposed to light.

The modules 10 can be identical. As exemplified by a module 10 shown in FIGS. 3A-3B, each module 10 can include a core 20 centered on an axis A. The core 20 can be solid or hollow, electrically insulating or conductive. The core 20 can be surrounded by a photovoltaic cell 22 extending fully about the axis A. The cell 22 can itself be surrounded by a transparent protective tube 24 capped by two axially opposite caps 26. The photocell 22 typically has three layers—a conductive radially-inner layer 31 overlying the core 20, a semiconductor photovoltaic middle layer 32, and a transparent conductive radially-outer layer 33. The inner and outer layers 31 and 33 are typically connected to an anode output contact 41 and a cathode output contact 42 at the axially opposite ends 51 and 52 of the cell 22.

Examples for such a configuration including the tube and caps are illustrated in U.S. patent application Ser. No. 11/378,847, filed Mar. 18, 2006, which is hereby incorporated by reference herein. In some instances, caps form a hermetic seal as described in U.S. patent application Ser. No. 11/437,928, which is hereby incorporated by reference herein.

Figure 3A:
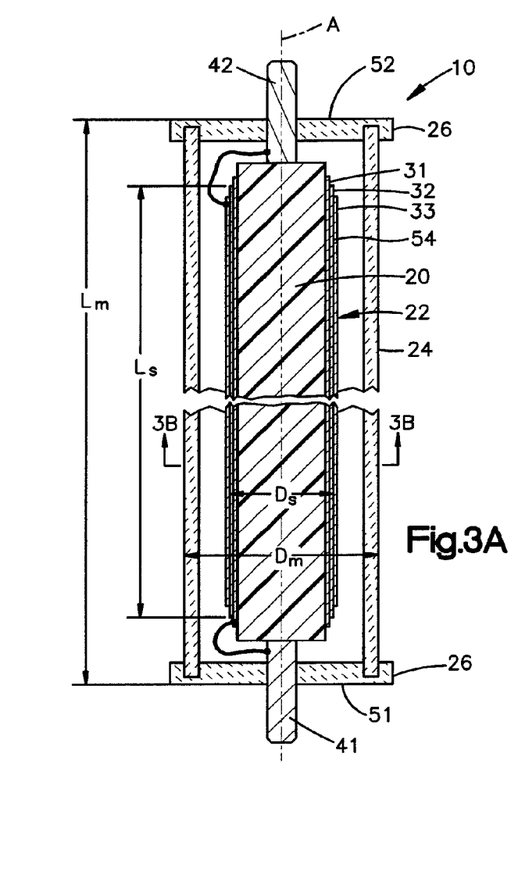
FIG. 3A is a sectional view of an exemplary one of the modules.
Figures 3B, 4:
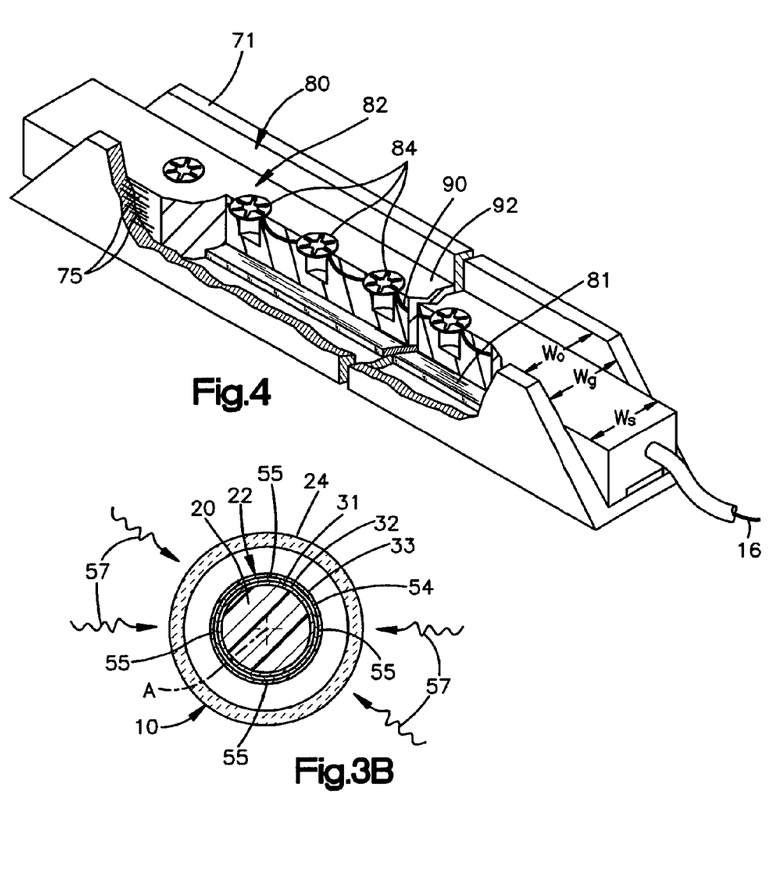
FIG. 3B is a sectional view taken at line 3B-3B of FIG. 3A.
FIG. 4 is a perspective view of a rail of the frame.

As shown in FIGS. 3A-3B, the photovoltaic middle layer 32 has a photovoltaic surface 54 that receives light to photovoltaically generate electricity. The electricity is conducted through the conductive layers 31, 33 to be output through the contacts 41, 42. The photovoltaic surface 54 in this example is cylindrically tubular. It thus includes an infinite number of contiguous surface portions 55, each facing away from the axis A in a different direction. These include, with reference to FIG. 3B, the four orthogonal directions up, down, left and right. Therefore, the cell 32 in this example, and thus the module 10, can photovoltaically generate electricity from light (exemplified by arrows 57) directed toward the module 10 from any radially-inward (i.e., toward the axis A) direction.

The width and breadth of the photovoltaic surface 54 in this example are equal to each other and to the surface's diameter $D_s$. The length $L_s$ of the surface 54 is greater than, and preferably over five times or over twenty times greater than, the diameter $D_s$ of the surface 54. Similarly, the length $L_m$ of the module 10 is greater than, and preferably over five times or over twenty times greater than, the diameter $D_m$ of the diameter of the module 10. The module's length and diameter in this example correspond to the lengths and diameter's of the module's outer tube 26.

As shown in FIG. 1, the frame 12 includes two axially-extending side rails 70 and laterally-extending first and second end rails 71 and 72. In this example, the rails 70, 71 and 72 are held together by corner brackets 74. The end rails 71, 72 rigidly secure the modules 10 in place and are themselves rigidly secured together by the side rails 70. Alternatively, the rails 70, 71 and 72 can be conjoined by means other than the brackets, such as a fit-connection or a pressure-connection between the rails 70, 71, and 72, as well as fasteners and/or adhesives.

The rails 70, 71, 72 can be extruded and stocked in long lengths from which shorter lengths can be cut to match the individual length needed for each application. To simplify warehousing and manufacturing, the side rails 70 can be cut from the same stock material as the end rails 71, 72.

The rails 70, 71, 72 can be formed of fiber reinforced plastic, such as with pultruded fibers 75 extending along the full length of the rail as illustrated by the first end rail 71 in FIG. 4. The fibers 75 resist stretching of the rail 71 to help maintain the preset center spacing of the modules 10 while enabling flexing of the respective rail. Examples of pultruded fibers are glass fibers and organic fibers such as aramid and carbon fibers, and compound materials.

The end rails 71, 72 in this example are identical, and described with reference to the first end rail 71 in FIG. 4. The end rail 71 has a laterally extending groove 80. A stiffening bar 81 can be adhered to the bottom surface of the groove 80 to stiffen the rail 71. The bar 81 in this example is narrower than the groove 80.

A socket strip 82 in the groove 80 can be adhered to both the top of the bar 81 and the bottom of the groove 80. The socket strip 82 in this example contains a chain of metal socket contacts 84 interconnected by an electrical bus line 90, all overmolded by a rubber sheath 92. The sheath 92 can electrically insulate the bus line 90 and secure the socket contacts 84 in place at a predetermined center spacing. The rail 71 accordingly contains the strip 82, and thus also the sockets 84 and electrical lines 90 of the strip 82. The width $W_s$ of the strip 82 can approximately equal the width $W_g$ of the groove 80 so as to fit snugly in the groove 80.

Alternatively, the width $W_o$ of the opening of the groove 80 could be smaller than the width $W_s$ of the strip 82, while the width $W_s$ of the strip 82 is be substantially equal to or smaller than the width $W_g$ of the groove. In this case, a lip or lip-like member of the groove 80 could be used to at least partially restrict the movement of the strip. In this case, the strip could be inserted into the channel or groove 80 from the end, or pressure-placed past the lip at the opening of the groove 80 into the groove 80 in the rail 71.

The sheath 92 can be flexible, and even rubbery, to reduce stress in the modules 10 and facilitate manipulation when being connected to the modules 10 or inserted into the rail 71. If sufficiently flexible, the sheath 92 can be manufactured in long lengths and stocked in a roll. Shorter lengths can be cut from the roll as needed, to match the length and number of sockets 84 needed for each application. Even if made flexible, the sheath 92 is preferably substantially incompressible and inextensible to maintain the center spacing of the modules 10. The sheath 92 can alternatively be rigid to enhance rigidity of the rail 71 or have rigid and flexible portions.

As illustrated with reference to one end 51 of one module 10 shown in FIG. 5, each electrical contact 41, 42 of each module 10 can be both electrically coupled to and mechanically secured by a corresponding socket contact 84. Potting material 110 can fill the groove 80 to encase the contacts 41, 84 and form a seal with each module 10 fully about the module 10. The potting material 110 isolates and hermetically seals the socket contacts 84 and module contacts 41, 42 from environmental air, moisture and debris, and further isolate any electrical connection between the device and the frame. The potting material 110 further adheres to each module 10 to secure the module 10 in place and stiffens the orientation of the ends 51, 52 of each module 10. Bowing of the module 10 from gravity and vibration is less than it would be if its ends 51, 52 were free to pivot about the socket 84. The reduction in bowing reduces the chance of the modules 10 breaking or contacting each other and helps maintain the predetermined center spacing of the modules 10.

Figure 6:
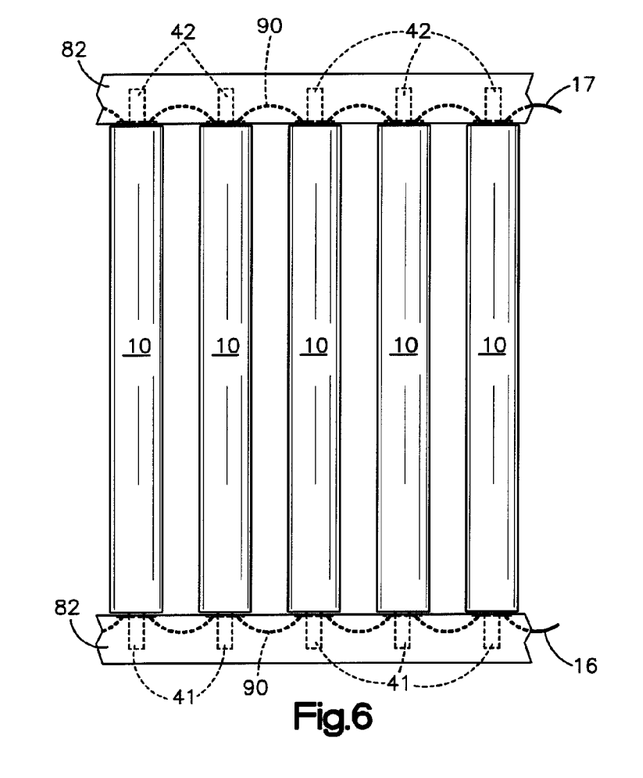
FIG. 6 is a top view of the array, showing electrical lines connecting the modules in parallel.

As shown in FIG. 6, the electrical line 90 in the first end rail 71 connects all the module anodes 41 to the common anode terminal 16. The electrical line 90 in the second end rail 72 connects all the module cathodes 42 to the common cathode terminal 17. The modules 10 are thus connected in parallel. In this manner, the electrical connection between the modules 10 are defined by two bus-like connections embedded within the framework. Additionally, the connections between the electrical contacts 42 may use ribbon-like or wire-like materials, so that any relative movement of the opposing rails, or relative movement between any two modules 10 does not impart stresses on the module contacts 41, 42 or the modules 10 themselves.

Figure 7:
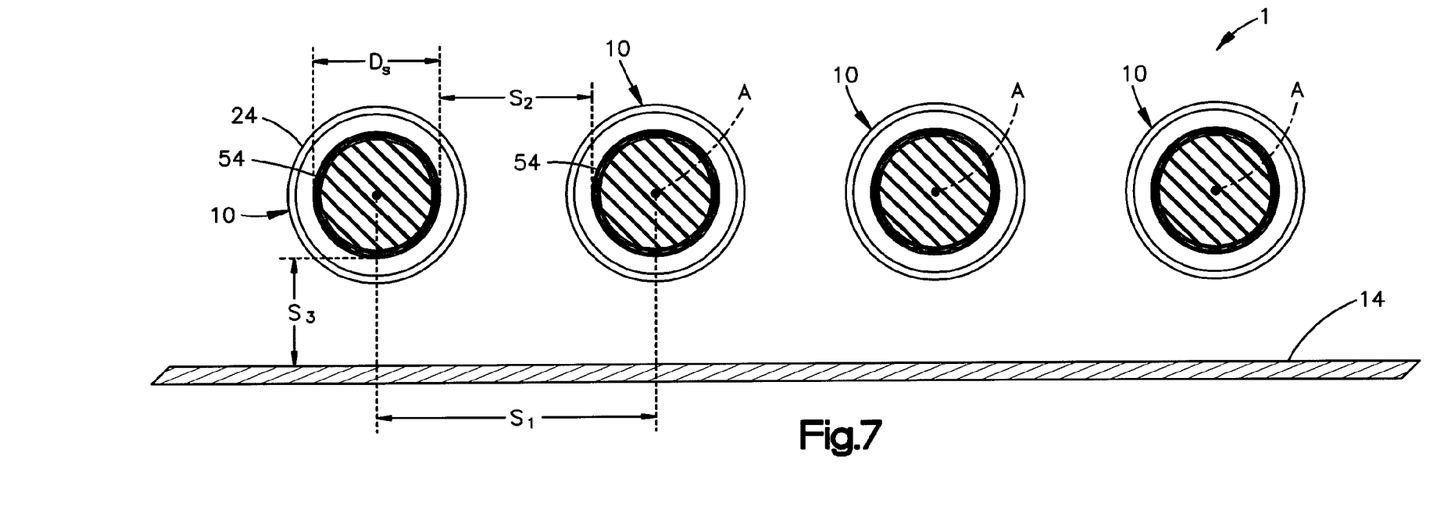
FIG. 7 is a side sectional view of the array, showing the spatial relationship of the modules to each other and to a reflective backplate.

In the assembled panel 1 shown in FIG. 7, the center spacing $S_1$ between modules 10 equals the diameter $D_s$ of the photovoltaic surface 54 plus the spacing $S_2$ between adjacent photovoltaic surfaces 54. The spacing $S_2$ is about 0.5 to about 2 times the diameter $D_s$. The spacing $S_3$ between each photovoltaic surface 54 and the reflective surface 14 is preferably about 0.5 to about 2 times the diameter $D_s$.

Figure 8:
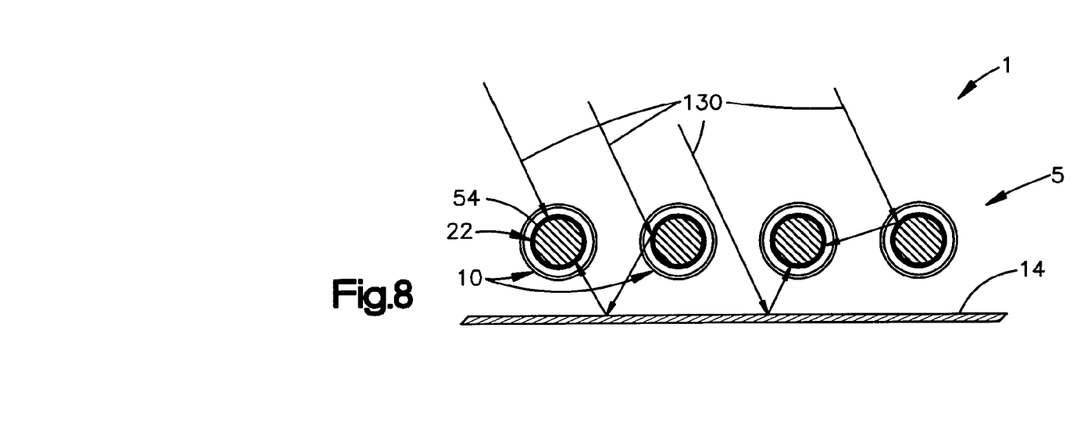
FIG. 8 is a sectional view similar to FIG. 7, showing the array exposed to sunlight.

FIG. 8 shows the panel 1 exposed to sunlight 130. As shown, the light 130 can impinge upon each photocell 22 in multiple ways. Light passing through the array 5, between photocells 22, is reflected by the reflective surface 14 back toward the array 5 to impinge upon one of the photocells 22. The light can also reflect off one cell 22 to impinge a neighboring cell 22.

Method of Assembly

Referring to FIG. 2, one method of assembling the panel 10 includes the following sequence of steps. First, the stiffening bars 81 and socket strips 82 are secured in the grooves 80 of the respective rails 71, 72. Then, the anode contacts 41 (FIG. 3A) of the modules 10 are connected to the socket strip 82 in the first end rail 71, and the cathode contacts 42 of the modules 10 are connected to the socket strip 82 in the second end rail 72. The side rails 70 are connected to the end rails 71, 72 with the four corner brackets 74. The potting material 110 (FIG. 5) is flowed into each groove 80, to encase the respective socket strip 82, and then hardened. The reflective surface 14 is fixed to the back of the framed 12. The output terminals 16, 17 can then be connected to an electrical device to power the device when the modules 10 are exposed to light. In an alternative method, the socket strips 82 are connected to the modules 10 before being mounted in the grooves 80, so that the socket strips 82 are more easily manipulated when connecting to the modules 10.

Alternative Embodiments

In the figures cited below, parts labeled with primed and multiply-primed reference numerals correspond to parts labeled in other figures with equivalent unprimed numerals.

Figure 5:
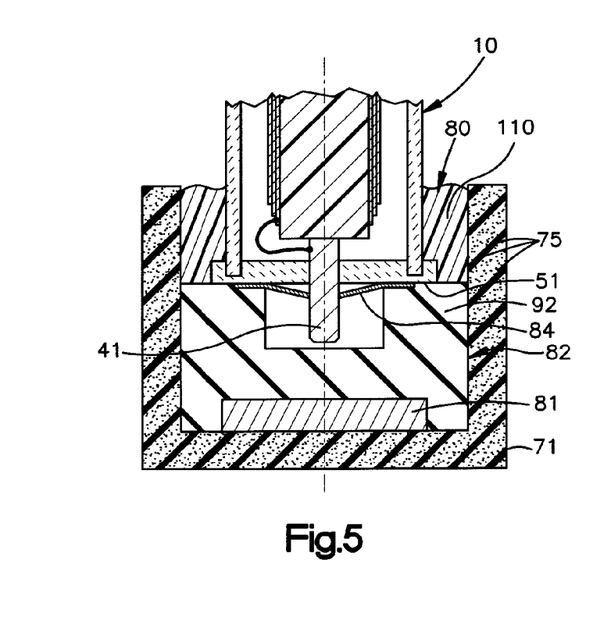
FIG. 5 is a sectional view showing interconnecting parts of the module and the rail.
Figure 9:
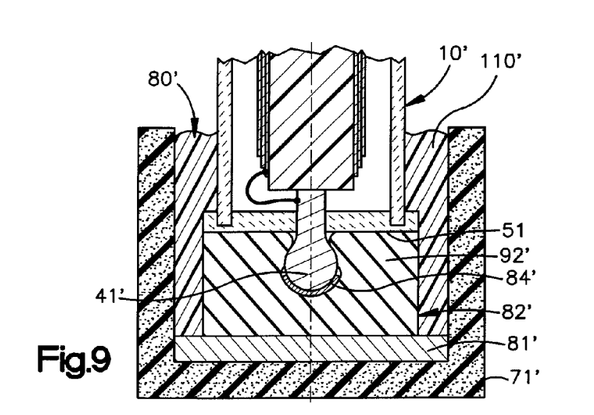
FIG. 9 is a sectional view similar to FIG. 5, with an alternative configuration of the interconnecting parts of the module and the rail.

In the first embodiment, as shown in FIG. 5, the module contact 41 is portrayed as cylindrical and grasped by the socket contact 84. Alternatively, module contacts can have another shape and need not be grasped by the socket contact 84. For example, FIG. 9 shows a spherical module contact 41' and an alternative socket strip 82' in which the sheath 92', instead of the socket 84, grasps the module contact 41'. The material surrounding the hole in the sheath 92', instead of the contact 84', is thus the socket in this embodiment securing the module 10 to the rail 71'. Additionally, in contrast to FIG. 5, the stiffening bar 81' in FIG. 9 is as wide as the groove 80' to provide a snug fit, and the socket strip 84' is narrower than the groove 80'. This enables the potting material 110' to engage the stiffening module 81' and both sides of the socket strip 82'.

Figure 10:
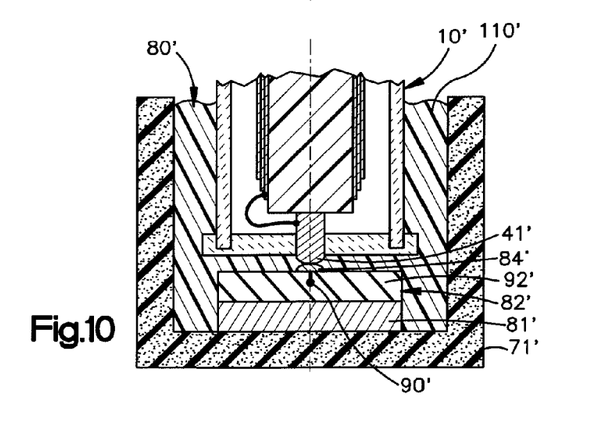
FIG. 10 is a sectional view similar to FIGS. 5 and 9, showing another alternative configuration of the interconnecting parts of the module and the rail.

FIG. 10 shows another alternative socket strip 82'. This differs from the configurations of FIGS. 5 and 9 in the following ways: The strip 82' of FIG. 10 neither receives nor secures the module contact 41'. The contacts 41', 84' of both the module 10' and the strip 82' are button contacts and outside the sheath 92'. This enables the strip 82' of FIG. 10 to be thinner than in the previous embodiments, and thus more flexible and more suitable for storing in rolls. The potting material engages both contacts 41', 84' and surrounds the interface between the contacts 41', 84'.

Figure 11:
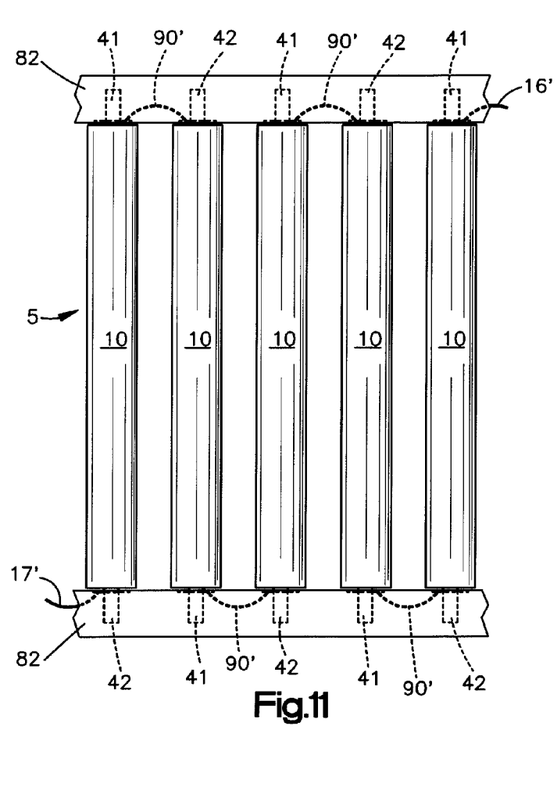
FIG. 11 is a top view similar to FIG. 6, showing electrical lines connecting the modules in series.

In the first embodiment, as shown in FIG. 6, the modules 10 are electrically connected in parallel. In another embodiment shown in FIG. 11, the modules 10 are connected in series. This can be achieved by flipping the axial orientation of every other module 10 in the array 5, so that the anode contact 41 of each module 22 is adjacent to a cathode contact 42 of an adjacent module 22. Each anode contact 41 can then be electrically connected by an electrical line 90' to an adjacent cathode cell 22.

Figure 12:
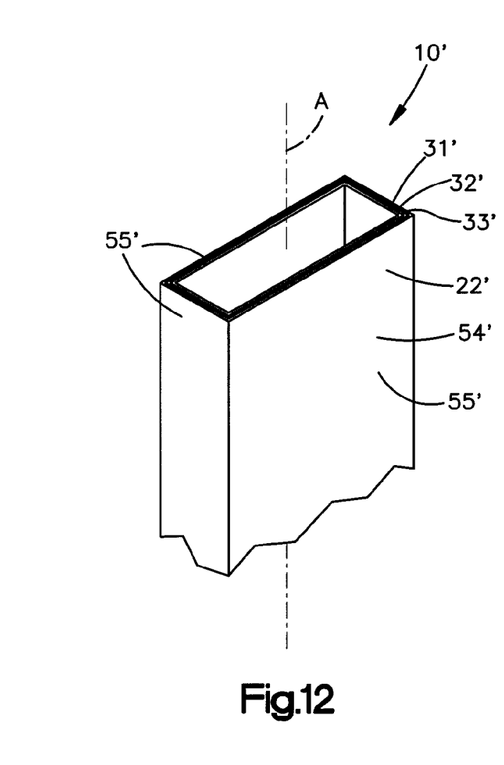
FIGS. 12-14 are perspective views of alternative modules.

Although the photovoltaic surface 54 is preferably cylindrical as shown above, other shapes are possible as mentioned above. For example, FIG. 12 shows a module 10' (with its electrode contacts omitted for clarity) that has a tubular photocell 22' having conductive inner and outer layers 31' and 33' and a photovoltaic middle layer 32'. The middle layer 32' is tubular with a rectangular cross-section. It thus provides four contiguous orthogonal flat photovoltaic surface portions 55' that face away from the axis A in different directions and together extend fully about the axis A. Like the cylindrical photocell configuration described above, this rectangular configuration can photovoltaically generate electricity from light rays directed toward the module 10' from any radially-inward direction, even though not all such light rays could strike the respective surface portion 55' perpendicularly. Similarly, other choices of shape can be used for the outer protective sleeves that fit over the cells 22.

Figure 13:
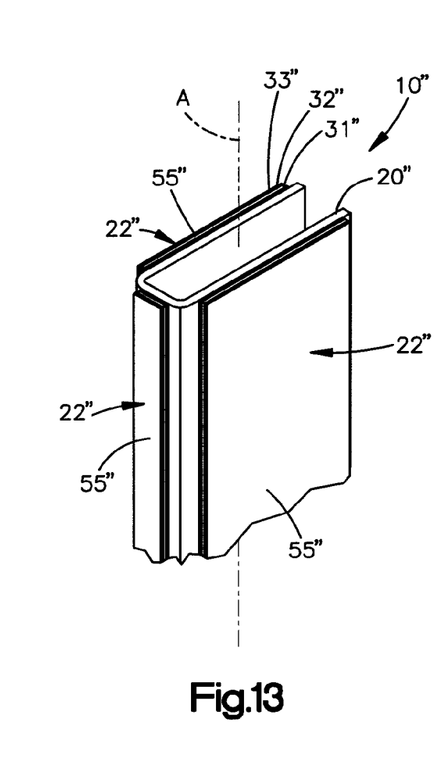
Figure 14:
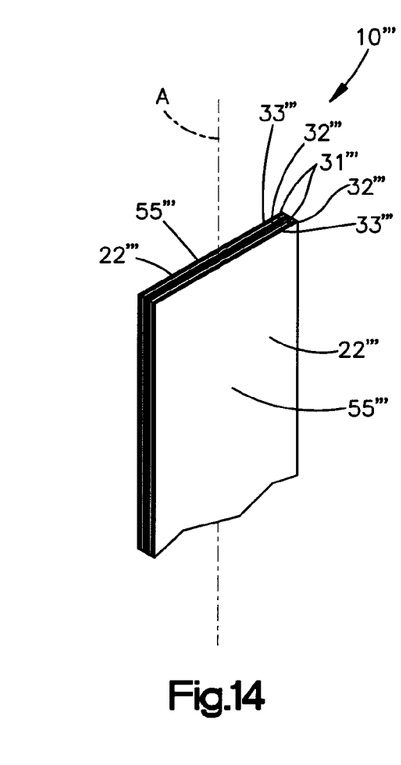

Each module 10 in the above example includes a single photovoltaic cell 22. Alternatively, each module 10 can have multiple cells. For example, FIG. 13 shows a module 10" having three separate cells 22" that together provide three separate orthogonal photovoltaic surface portions 55" that face away from the axis A in three different directions. FIG. 14 shows a module 10''' made of two photocells 22''' glued back-to-back to provide two separate flat photovoltaic surfaces 55''' facing away from each other and the axis A.

The module 10 can have one contiguous photovoltaic cell. Or, it can have several photovoltaic cells, connected in serial or in parallel. These cells can be made as a monolithic structure that has the plurality of cells scribed into the photovoltaic material during the semiconductor manufacturing stage. Examples of such a monolithically integrated cells are disclosed in, for example, in U.S. patent application Ser. No. 11/378,835, which is hereby incorporated by reference herein. Further, as noted above, the cross-sectional geometry of such an elongated module need not be limited to the cylindrical embodiment described above. Indeed, the cross-sectional geometry can by polygonal, e.g., an n-sided polygon where n is any positive integer greater than two. For example, the cross-sectional geometry can be square planar (n=4), a pentagon (n=5) and so forth. Moreover, the cross-sectional geometry can be any regular (e.g. square) or irregular closed form shape.

In the first embodiment, each photocell 22 is sealed in a transparent protective tube 24 (FIG. 3A). Alternatively, the tube 24 can be replaced with a protective coating or omitted entirely. The potting material 110 could then form a seal with the coating or with the photocell 22 itself.

Figure 15:
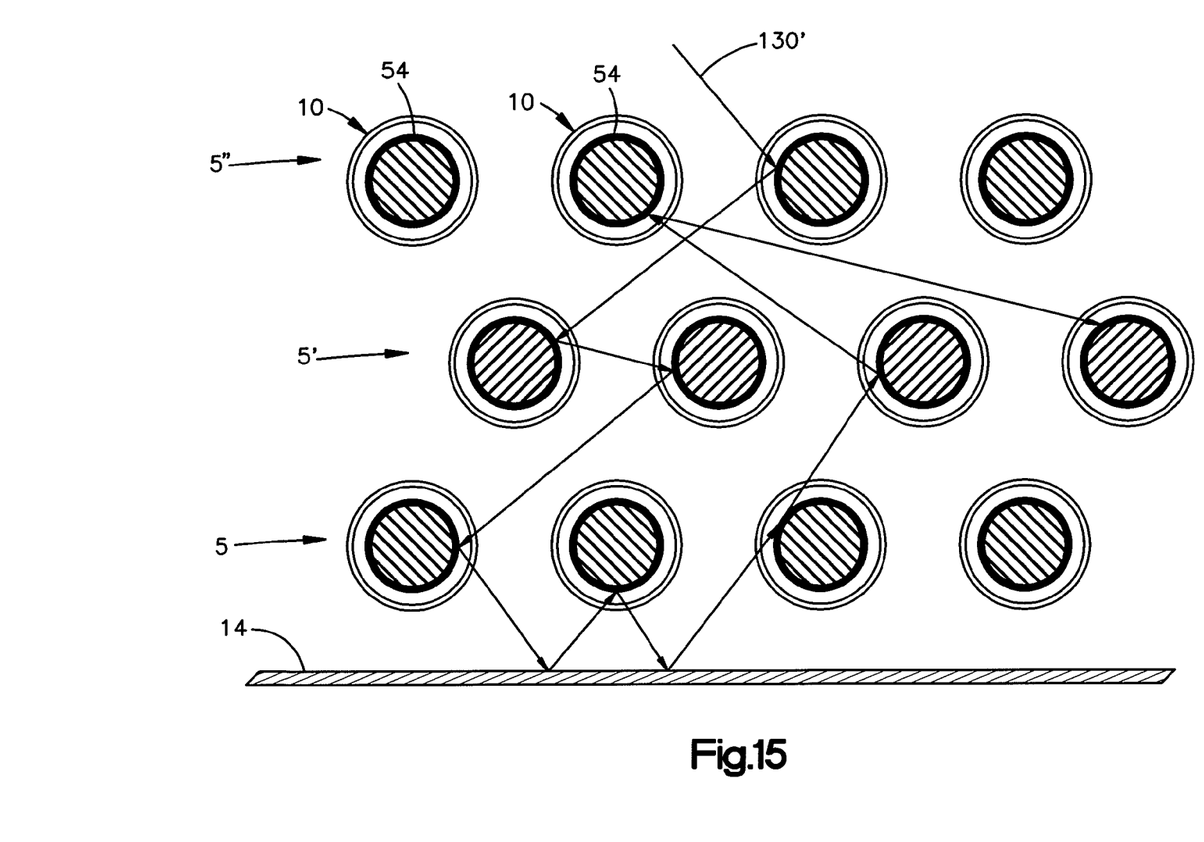
FIG. 15 is a sectional view of a two-dimensional array of the modules.

FIG. 15 shows a two-dimensional array formed from three one-dimensional arrays 5, 5', 5" stacked one over the other. This can be achieved by stacking three panels like the panel 1 (FIG. 1) described above. The reflective surface 14 is mounted behind the bottom array 5. A light ray 130' can be reflected any number of times from any number of photovoltaic surfaces 54 of the three arrays 5, 5', 5" and from the reflective surface 14. The increased number of cell surfaces 54 being exposed to the light ray 130' increases efficiency of converting that light ray 130' to electricity.

The reflective surface 14 can be a self-cleaning surface such as, for example, any of the self-cleaning surfaces disclosed in U.S. patent application Ser. No. 11/315,523, filed Dec. 21, 2005 which is hereby incorporated by reference herein for the purpose of disclosing such surfaces.

The fibers 75 in the above example extend linearly along the length of each rail 70, 72, 73. However, other forms are possible, such as roving strands, mats or fabrics, which can take different orientations in relation to the shapes and dimension of the final products formed during a pultrusion process. Alternative materials for the rails 70, 71, 72 are other plastics, metals, extruded materials, and other types of preformed and cut materials.

The apparatus 1 described above thus provides examples of the following features: In a set of electrically-interconnected photovoltaic modules, each module is elongated along an axis A and has first and second axially opposite ends. Each module has photovoltaic surface portions facing away from the axis in different directions to receive light to generate electricity. The first ends of the modules are fixed to a first end rail.

The modules can be in a one-dimensional array or in a two-dimensional array. The modules can be fixed in a mutually parallel configuration. The surface portions can be portions of a continuous photovoltaic surface that extends fully about the axis, and can be cylindrical.

Preferably, a socket strip is secured in a groove of the end rail and has a chain of sockets. Each socket is configured to secure one end of a respective module to the end rail. The sockets are interconnected by electrical lines within the strip to provide the electrical interconnection between the modules. The strip is as wide as the groove. The strip can be sufficiently flexible to store in a roll. A stiffening bar can be secured in the groove for stiffening the first end rail.

Preferably, the second ends of the modules are fixed to a second end rail. The orientations of the modules are rigidly fixed by the end rails. Each module has an anode contact at the first end and a cathode contact at the second end, and the end rails contain electrical lines that electrically interconnect the modules. One of the electrical lines can extend through the first end rail and interconnect the anode contacts, and another of the electrical lines can extend through the second end rail and interconnect the cathode contacts, for the modules to be electrically interconnected in parallel. Alternatively, the anode contact of each module can be adjacent to, and electrically connected by one of the lines to, a cathode contact of the adjacent module, for the modules to be electrically interconnected in series.

Each module can have an electrical contact at the first end. The first end rail can contain electrical socket contacts that are spaced apart along the length of the first end rail and configured to both electrically contact and mechanically secure a respective one of the module contacts.

Two axially-extending side rails, between which the array is located, rigidly connect the end rails together. The first end rail includes a groove into which each module is inserted and potted in place with potting material. The potting material forms a seal with at last one of the modules fully about the circumference of the module. Each module is configured to photovoltaically generate electricity from light directed toward the module from any radially-inward direction. A reflective surface can be configured to reflect light that has passed through the array back toward the array.

The scope of the invention is defined by the claims, and may include other examples that occur to those skilled in the art. Such other examples are intended to be within the scope of the claims if they have elements that do not differ from the literal language of the claims, or if they include equivalent structural elements with insubstantial differences from the literal language of the claims.

The invention claimed is:

1. A solar panel apparatus comprising:
   a first end rail;
   an elongated groove that extends along the length of the first end rail and has an elongated opening that extends along the length of the first end rail;
   an elongated socket strip secured in the groove and sufficiently flexible to store in a roll, the strip including an elongated non-electrically-conductive flexible sheath that extends along the length of the groove and sockets that are fixed in and supported by the sheath and spaced apart along the length of the sheath, and;
   a set of photovoltaic modules, each module being elongated along an axis that is perpendicular to the first end rail and having first and second axially opposite ends, each module having photovoltaic surface portions facing away from the axis in different radially-outward directions to receive light to generate electricity, the first end of each module extending through the opening into the groove, and each module having an electrical contact at its first end to output the electricity, the electrical contact being physically secured to and electrically connected to a respective one of the sockets; and
   wires or ribbons, located entirely within the sheath, that electrically interconnect the sockets to conduct the electricity from the respective modules' first ends.

2. The apparatus of claim 1 wherein the socket strip is approximately as wide as the groove.

3. The apparatus of claim 1 wherein the strip is wider than the opening of the groove.

4. The apparatus of claim 1 further comprising
   a second end rail having a series of sockets, each configured to physically secure the second end of a respective module to the second end rail; and
   wires or ribbons extending through the second end rail and electrically interconnecting the sockets in the second end rail to conduct the electricity from the second ends of the respective modules.

5. The apparatus of claim 4 wherein each module has an anode contact at its first end and a cathode contact at its second end, and the wires or ribbons of the end rails together electrically interconnect the modules in parallel.

6. The apparatus of claim 1 wherein the modules include a first module having an anode contact at its first end and a cathode contact at its second end, and further include a second module having a cathode contact at its first end and an anode contact at its second end, and the wires or ribbons within the sheath connect the anode contact of the first module to the cathode contact of the second module.

7. The apparatus of claim 4 wherein the modules include first modules each having an anode contact at its first end and a cathode contact at its second end, and the modules further include second modules each having a cathode contact at its first end and an anode contact at its second end, with the first modules and second modules interconnected in series by the wires or ribbons in the end rails.

8. The apparatus of claim 1 wherein each module is inserted into the groove and potted in place with potting material that is a different component than the end rail.

9. The apparatus of claim 8 wherein the potting material forms a seal with the module fully about the circumference of the module.

10. A solar panel apparatus comprising:
    first and second parallel end rails;
    first and second elongated grooves that respectively extend along the lengths of the first and second end rails, each groove having an elongated opening that extends along the length of the respective end rail;
    first and second elongated socket strips respectively secured in the first and second grooves and sufficiently flexible to store in a roll, each socket strip located entirely within the respective groove, and each socket strip including an elongated non-electrically-conductive flexible sheath that extends along the length of the respective groove, and sockets that are fixed in and supported by the sheath and spaced apart along the length of the sheath, and wires or ribbons located entirely within the sheath; and
    first and second sets of photovoltaic modules, each module being elongated along an axis that is perpendicular to the end rails and having first and second axially opposite ends, each module having photovoltaic surface portions facing away from the axis in different radially-outward directions to receive light to generate electricity, and each module having an anode contact and a cathode contact that are located at the module's axially opposite ends to output the electricity;
    each module of the first set being oriented with its anode contact electrically connected to a respective socket in the first end rail and its cathode contact electrically connected to a respective socket in the second end rail;
    each module of the second set being oriented with its cathode contact electrically connected to a respective socket in the first end rail and its anode contact electrically connected to a respective socket in the second end rail; and
    each of the wires or ribbons in the first and second end rails electrically connecting the socket of the anode of one of the modules to the socket of the cathode of another one of the modules within the same end rail, for the wires or ribbons to electrically connect the modules of the first and second sets together in series.

11. The apparatus of claim 10 wherein each of the anode and cathode contacts is received by and mechanically secured to the socket that it is electrically connected to.

12. The apparatus of claim 10 wherein each socket strip is approximately as wide as the respective groove.

13. The apparatus of claim 10 wherein each socket strip is wider than the opening of the respective groove.

14. The apparatus of claim 10 wherein each module of the first set is adjacent to a module of the second set, and each of the wires or ribbons electrically connects the socket of the anode of one of the modules to the socket of the cathode of an adjacent module within the same end rail.

15. The apparatus of claim 10 wherein the axially opposite ends of each module are respectively inserted into the grooves of the first and second end rails and potted in place with potting material that is located in the respective groove and is a different component than the respective end rail.

16. The apparatus of claim 15 wherein the potting material in each end rail forms a seal with each module fully about the circumference of the module.

17. The apparatus of claim 15 wherein the potting material in each end rail fills the respective groove to encase the contacts that are in the groove.

18. The apparatus of claim 15 wherein each socket does not receive or mechanically secure the respective module contact, and the module is secured in place instead by the potting material.

19. The apparatus of claim 10 wherein the photovoltaic surface portions of each module are portions of a cylindrical photovoltaic surface.

20. The apparatus of claim 10 further including first and second side rails that rigidly secure the first and second end rails together, the first side rail connecting one end of the first end rail to one end of the second end rail and the second side rail connecting the opposite end of the first end rail to the opposite end of the second end rail.

21. The apparatus of claim 10 further including a stiffening bar adhered to a bottom surface of each groove and extending along the length of the groove to stiffen the end rail.

22. The apparatus of claim 10 wherein each end rail has a lip that restricts movement of the socket strip in the groove.

* * * * *